Patented Jan. 2, 1923.

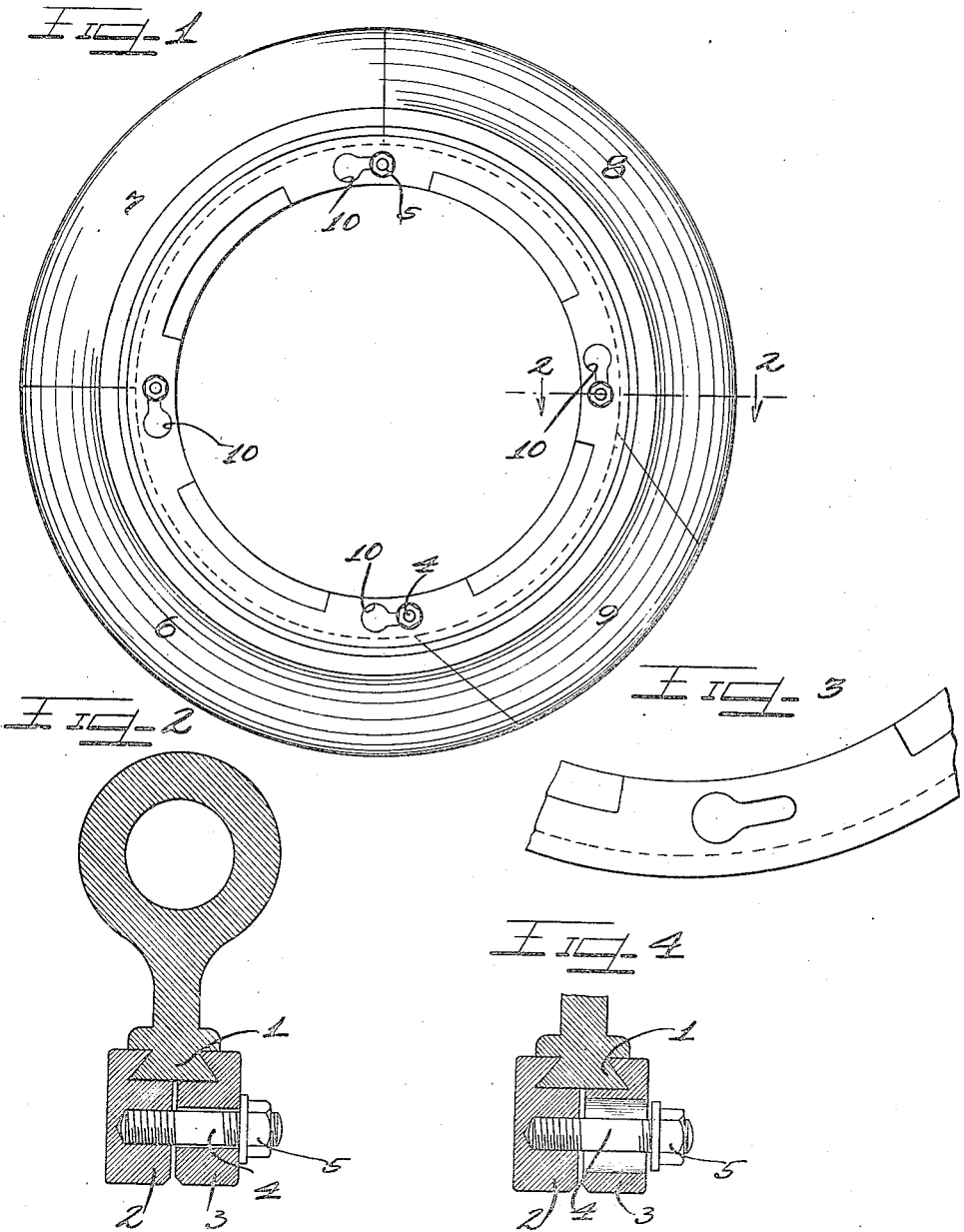

1,440,495

UNITED STATES PATENT OFFICE.

FOREST A. RICHARDS AND CHESTER M. SHOGREN, OF EAU CLAIRE, WISCONSIN, ASSIGNORS TO GILLETTE RUBBER CO., A CORPORATION OF WISCONSIN.

COLLAPSIBLE TIRE CORE.

Application filed February 10, 1921. Serial No. 443,781.

*To all whom it may concern:*

Be it known that we, FOREST A. RICHARDS and CHESTER SHOGREN, citizens of the United States, and residents of the city of Eau Claire, in the county of Eau Claire and State of Wisconsin, have invented certain new and useful Improvements in a Collapsible Tire Core; and we do hereby declare that the following is a full, clear, and exact description of the same, reference being had to the accompanying drawings, and to the numerals of reference marked thereon, which form a part of this specification.

This invention relates to tire cores, especially that species which comprises a collapsible or sectional feature adapting it particularly for moulding tires, and it is an object of this invention to provide a novel sectional core and mounting that insures perfect alinement of the parts and affords ease and rapidity of assembling together with other advantages hereinafter pointed out. Our invention comprises the novel features of construction hereinafter described and more particularly pointed out in the appended claim.

In the accompanying drawing which illustrates a preferred embodiment of our invention and in which similar reference numerals refer to similar features in the different views:

Figure 1 is a side elevation of a tire core embodying the novel features of our invention.

Figure 2 is a section on the line 2—2 of Figure 1.

Figure 3 is a fragmentary side view of a portion of the mounting for the core.

Figure 4 is a sectional detail showing an assembling feature.

As shown in the drawings:

In the process of moulding tires it is necessary to employ a core that is made in sections in order that the same may be removed from the tire after the same is moulded. To keep these sections in true alinement, and to readily assemble and disassemble them, we have provided an annular adjustable mounting that is provided with a dove tail groove into which fit the dove tails 1 provided on the core sections. The adjustable mounting comprises a pair of annular rings 2 and 3, each of which is provided with a triangular or undercut groove, which together form the said dove tail groove when the rings are in assembled relation. In order to hold said rings in assembled relation studs 4 may be provided on one section 2 to project through bayonet slots in the other section 3 and nuts 5 secured to said studs to bind said rings against the dove tails of said core sections when said studs are in the narrow ends of said slot. In the structure shown in the drawings, four studs are shown screw threaded into section 2 and projecting through said bayonet slots in the section 3. The enlargements 10 of the bayonet slots are adapted to allow the studs with the nuts thereon to pass therethrough, so it is only necessary to slightly rotate the ring 3 to bring the studs into the narrow necks of the bayonet slots as shown in Figure 1.

As shown in the drawing, the core upon which the tire is adapted to be moulded comprises a plurality of sections 6, 7, 8 and 9 having dove tails 1 which fit in the grooves of the mounting, the section 9 being wedge shaped so that it can be readily removed from the tire after the moulding process is complete.

In assembling the core the core sections are placed on the ring member 2, which has the studs 4 with the nuts 5 properly adjusted thereon. Ring 3 is next put in place on ring 2, studs 4 and nuts 5 passing through the enlargements 10 of the bayonet slots, and slightly rotated to bring the studs 4 into the narrow necks of the bayonet slots. Then by tightening the nuts 5, the core sections are firmly clamped between said rings in perfect alinement. In taking the core apart, the nuts 5 are slightly loosened, ring 3 rotated to bring the enlargements 10 of the bayonet slots in alinement with the studs when the ring 3 can be readily removed. But little time and labor is required in either operation, and a true alinement of the sections is readily maintained.

We are aware that numerous details of construction may be varied through a wide range without departing from the principles of this invention, and we therefore do not purpose limiting the patent granted otherwise than necessitated by the prior art.

We claim as our invention:

In a device of the class described, a sectional core having its web portions terminating in dove-tails, a pair of ring members having complemental undercut grooves in their upper surfaces adapted for slidably receiving and supporting said dove-tails, one of said ring members having projecting studs and the other having bayonet slots adapted to receive said studs for interlocking said ring members.

In testimony whereof we have hereunto subscribed our names in the presence of two subscribing witnesses.

FOREST A. RICHARDS.
CHESTER M. SHOGREN.

Witnesses:
R. U. HUTCHENS,
N. B. PAYNE.